United States Patent [19]

Mole et al.

[11] 4,185,216
[45] Jan. 22, 1980

[54] CIRCUMFERENTIALLY-SEGMENTED MAGNET HOMOPOLAR DYNAMOELECTRIC MACHINE

[75] Inventors: Cecil J. Mole, Monroeville; Henry E. Haller, III, Pittsburgh; Leonard N. Wedman, Franklin, all of Pa.

[73] Assignee: Westinghouse Electric Corp., Pittsburgh, Pa.

[21] Appl. No.: 891,564

[22] Filed: Mar. 29, 1978

[51] Int. Cl.² .................................... H02K 31/00
[52] U.S. Cl. .............................. 310/178; 310/127; 310/186; 310/219
[58] Field of Search ............. 310/178, 179, 219, 181, 310/46, 185, 254, 187, 258, 216, 186, 217, 127, 218

[56] References Cited

U.S. PATENT DOCUMENTS

| | | | |
|---|---|---|---|
| 2,429,180 | 10/1947 | Barlick | 310/218 |
| 2,677,066 | 4/1954 | Serna | 310/178 |
| 3,862,445 | 4/1974 | Voikrodt | 310/181 |
| 3,921,017 | 11/1975 | Hallerback | 310/216 |
| 4,011,479 | 3/1977 | Volkrodt | 310/181 |
| 4,032,807 | 6/1977 | Richter | 310/178 |
| 4,041,337 | 8/1977 | Mole | 310/178 |
| 4,114,057 | 9/1978 | Esters | 310/46 |

*Primary Examiner*—R. Skudy
*Attorney, Agent, or Firm*—G. H. Telfer

[57] ABSTRACT

A homopolar dynamoelectric machine is provided in which the magnetic fields are segmented circumferentially of the machine. Longitudinal field windings are placed in recesses in a cylindrical stator and energized so as to provide radial magnetic fields in polar regions between the field windings. Stator conductors are placed in slots in the polar regions. The rotor carries longitudinal conductors on its surface positioned to cut the radial magnetic fluxes, and current-collecting means are provided at both ends of the machine to make electrical contact with both ends of the rotor conductors. The current-collecting means are connected to the stator conductors to complete the electrical circuit of the machine.

8 Claims, 5 Drawing Figures

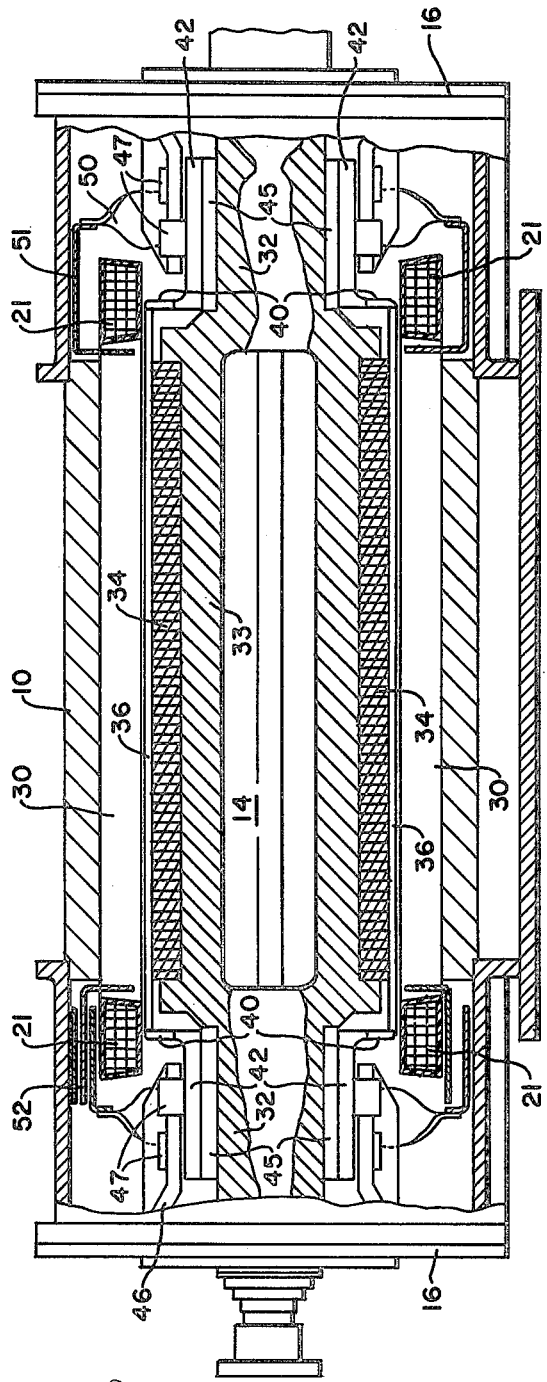
Fig. 2
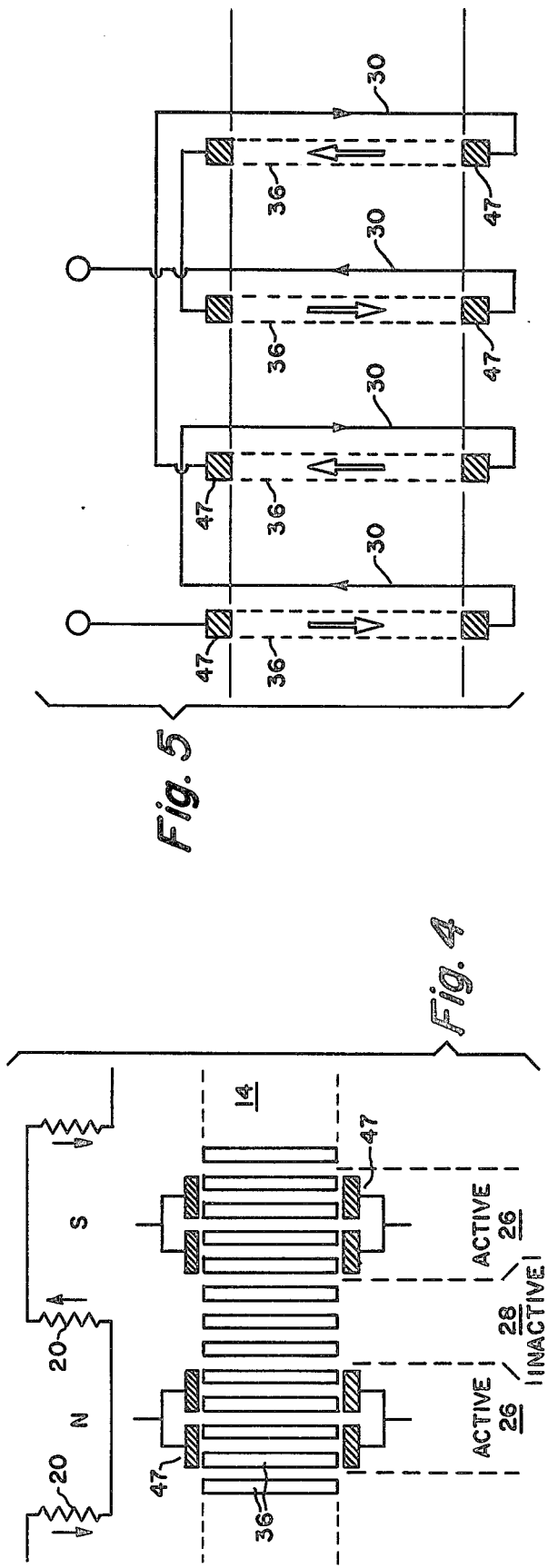
Fig. 5
Fig. 4

CIRCUMFERENTIALLY-SEGMENTED MAGNET HOMOPOLAR DYNAMOELECTRIC MACHINE

The United States government has rights in this invention pursuant to Contract N00014-76-C-0619 awarded by the Department of the Navy.

BACKGROUND OF THE INVENTION

The present invention relates to direct current dynamoelectric machines, and more particularly to a homopolar machine with circumferentially-segmented magnets.

Homopolar machines in which rotor conductors pass continuously through a unidirectional or unipolar magnetic field are well known. These machines are capable of producing relatively high power outputs with good efficiency, but the known types of homopolar machines require very strong magnetic fields and are inherently low-voltage, high-current machines. The high current outputs of these machines result in difficult current collection problems requiring complicated and expensive arrangements of slip rings with many brushes, or liquid metal current-collecting schemes which involve the use of potentially dangerous materials, such as sodium-potassium alloys. For these reasons, homopolar machines have not been used extensively and have been considered suitable only for certain special applications.

It has been proposed in Mole U.S. Pat. No. 4,041,337 to overcome some of these problems of conventional homopolar machines by providing an axially-segmented magnet machine. In this machine, the magnetic field is divided into segments along the axis of the machine with corresponding axially-spaced rotor segments which may be series-connected to obtain the desired output voltage. Such a machine, especially if superconducting field magnets are used, is capable of relatively high output for a machine of given size but it has certain undesirable limitations. The type of flux path utilized, extending axially through the rotor, results in geometric limitations on the size of the machine, or on the size of each of the axial modules, while the size and losses of the current-collection system required impose severe limitations on the design of the machine as well as requiring liquid metal current-collection systems in most cases, with the attendant complication and risks.

SUMMARY OF THE INVENTION

The present invention provides an improved homopolar machine in which the problems discussed above are eliminated or minimized by the utilization of circumferentially-segmented magnets.

In accordance with the invention, axially-extending field windings are arranged in circumferentially-spaced recesses in the inner cylindrical surface of a stator member, and are energized in a manner to produce radial magnetic fields in the polar regions between the field windings. These radial fields alternate in polarity around the machine and a circumferentially-segmented field structure is thus provided. Longitudinal stator conductors are placed in slots in each of the polar regions of the stator. The rotor conductors are preferably carried on the surface of a cylindrical rotor and extend longitudinally of the machine. The arrangement of the machine is such that the rotor conductors pass successively through active zones corresponding to the polar regions, in which the magnetic flux is concentrated, and through inactive or null zones in which there is substantially no flux. Current-collecting means are provided at both ends of the machine to make electrical contact with both ends of the rotor conductors as they pass through the active zones. The conductors passing through the null zones carry no current and are not in the electrical circuit. The current-collecting means are connected to the stator conductors in such a manner that the stator conductors are in series with rotor conductors and carry currents in the opposite direction to the currents in the rotor conductors, thus compensating for the fields produced by the rotor currents. In this way, a machine is produced which can be of small size and weight and relatively low cost but produces a high power output. The current-collection problem is minimized so that graphite or metal-graphite brushes can be used and adequate magnetic fields can be provided without resort to excessively bulky field coils or the complication and expense of superconducting magnets.

BRIEF DESCRIPTION OF THE DRAWINGS

The invention will be more fully understood from the following detailed description, taken in connection with the accompanying drawings, in which:

FIG. 2 is a longitudinal sectional view of the machine of FIG. 1;

FIG. 4 is a diagrammatic developed view of a portion of the rotor surface showing the arrangement of the conductors and brushes; and FIG. 5 is a schematic diagram showing an illustrative electrical circuit.

DESCRIPTION OF THE PREFERRED EMBODIMENT

Figure 1:
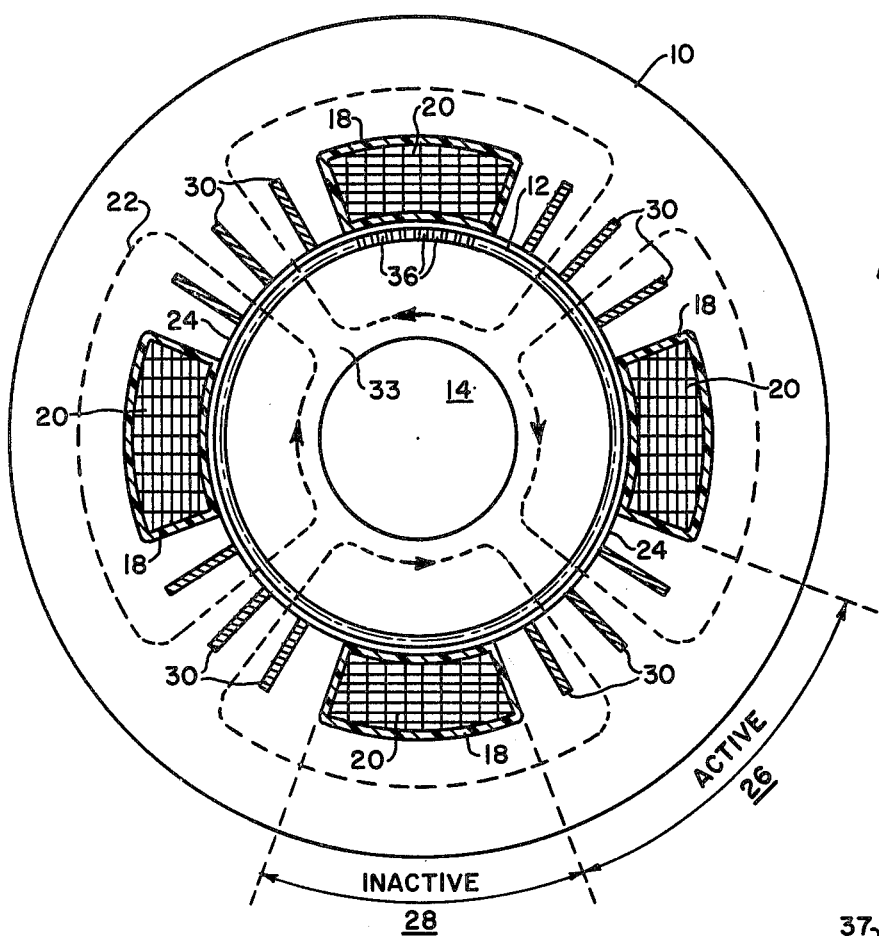
FIG. 1 is a somewhat diagrammatic transverse view of a dynamoelectric machine embodying the invention.

The invention is shown in the drawings embodied in a four-pole generator, although it will be understood that the machine may have any number of poles and that such a machine can be operated equally well as either a generator or a motor.

As shown somewhat diagrammatically in FIG. 1, the machine has a stator member 10 with a cylindrical internal surface 12. The rotor 14 is disposed within the stator 10, as shown in FIG. 2, and is supported in bearings (not shown) at each end for rotation within the stator. Any desired mechanical construction may be utilized and housing means of any suitable type, generally indicated at 16, may be provided.

The stator 10 is generally tubular with a cylindrical internal surface 12 as indicated above and, if desired or necessary, part or all of the stator may be laminated. The stator is made of magnetic material to provide a flux path for the magnetic fields and has a plurality of circumferentially-spaced, longitudinally-extending recesses 18 in the internal cylindrical surface. Field windings 20 are placed in the recesses 18 extending longitudinally of the machine, and the field windings are connected at the ends of the machine by circumferentially-extending end turns 21 to complete the field coils. The field windings 20 are made up of a suitable number of conductors extending longitudinally through the recesses 18 and insulated from the stator 10. Cooling ducts can be incorporated in the field windings if needed. The number of field windings 20 corresponds to the number of poles in the machine, four being shown in the illustrative embodiment, and they are connected to a source of direct current excitation in a manner such that the direction of current flow is opposite in adjacent windings. The field windings 20, therefore, produce magnetic fields extending radially across the airgap between the stator and rotor, and alternating in polarity around the machine, as shown by the flux paths indicated by dotted lines 22 in FIG. 1.

It will be seen that a multipolar magnetic field is provided having four poles of alternating polarity in the illustrative embodiment. The recesses 18 which contain the field windings separate or divide the internal surface 12 of the stator into a corresponding number of polar regions with pole faces 24 which carry the radial magnetic flux. The recesses 18 in which the field coils are placed separate and define the polar regions and the machine is thus divided or segmented circumferentially, as shown in FIG. 1, into active zones 26, in which the radial flux is concentrated, and null or inactive zones 28, corresponding to the positions of the recesses 18, which are substantially free of magnetic flux in the airgap region of the machine. Thus, a circumferentially-segmented magnetic field structure is provided. Stator conductors 30 are also provided which are included in the electrical circuit of the machine as hereinafter described. The conductors 30 are placed in longitudinal slots in the pole face regions 24 as shown and may be insulated copper bars, or other suitable conductors. Any desired or necessary number of conductors 30 may be provided in each pole face 24.

Figure 3:
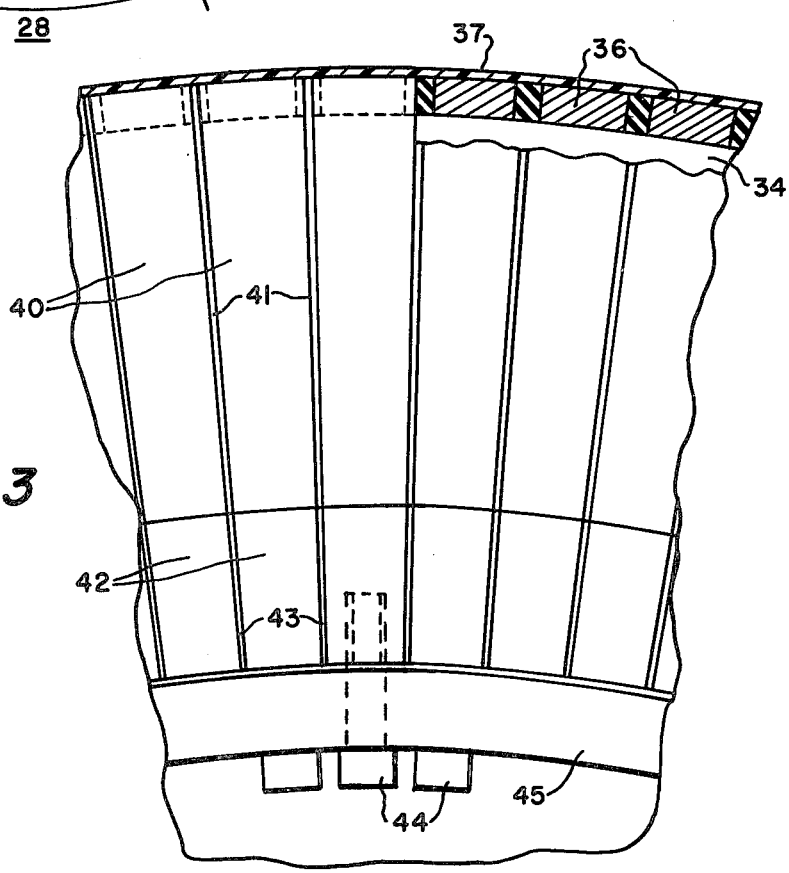
FIG. 3 is a fragmentary end view of the rotor on a larger scale.

As previously mentioned, the rotor 14 is generally cylindrical and has shaft or spindle portions 32 at each end supported for rotation. The rotor may be hollow, as shown in FIG. 2, to reduce the weight and to provide space for cooling ducts or passages, if desired, and has a central tubular body portion 33 with a cylindrical outer surface. At least the outer periphery of the rotor 14 should be laminated to reduce eddy current losses, and an annular laminated peripheral portion 34 is shown in FIG. 2 having a cylindrical surface and built up of suitable punchings compressed between clamping means of any desired type. The rotor conductors 36 may be insulated conductor bars of any suitable type and are preferably stranded, or made up of a suitable number of wires or other conductors, transposed as necessary, and formed into generally rectangular insulated bars as shown. The rotor conductors 36 might be placed in longitudinal slots in the rotor surface, but in order to reduce the inductance of the rotor winding, the conductors are preferably placed directly on the outer cylindrical surface of the laminated portion 34 as can be seen in FIGS. 1 and 3. The conductors 36 are held in place on the rotor surface in any suitable manner, preferably by banding 37 which may consist of resin-impregnated glass tape, or other suitable banding material, wound over the rotor bars with suitable tension to hold the bars in position during operation.

As the rotor conductors 36 move across the radial magnetic fields, upon rotation of the rotor, voltages are generated in the conductors 36 and electrical connections are made to both ends of each conductor. Each rotor conductor may be provided at both ends with any suitable type of contact means which can be engaged by stationary brushes or other current-collecting means. In the preferred embodiment shown in FIGS. 2 and 3, each rotor conductor 36 has an insulated connector 40 connected to each end beyond the end of the rotor body 33. The connectors 40 may be copper bars, or any other suitable type of connector, and are insulated from each other as indicated at 41. The connectors 40 extend radially inward of the rotor from the ends of the conductors, and each connector 40 is attached to a collector segment 42 at its inner end. The segments 42 are also insulated from each other as indicated at 43. The segments 42 fit closely together around the circumference of the rotor to form a substantially continuous ring, and each segment is attached by a bolt 44 to a support ring 45 which is secured to the spindle portion 32 of the rotor in any suitable manner, as by shrinking in place. It will be seen that a cylindrical current-collecting surface is thus provided at each end of the rotor which is of smaller radius than the rotor surface so that the peripheral velocity is correspondingly less and the problem of current collection is made easier. The current-collecting surface, however, is made up of individual insulated segments to permit individual connection to the several rotor conductors. The segments 42 are made as long as necessary in the axial direction to provide adequate surface area for the currents involved to keep the current density within permissible limits for the brush material to be used.

Current-collecting means of any suitable type are provided at both ends of the machine to make electrical contact with the collector segments 42. The current-collecting means may comprise brush-holders and brushes of any desired type. Thus, as shown in FIG. 2, brush-holders 46 are supported on the machine at each end extending over the collector segments 42 at that end and carrying brushes 47 which engage the cylindrical surface formed by the segments 42. The brush-holders may be of any suitable type capable of supporting the necessary number of brushes, and the brushes themselves may be of any type capable of handling relatively high current densities. Graphite or metal-graphite brushes have been found to be suitable for this purpose. The brushes 47 may be of any necessary size, and they may be arranged in any desired manner to engage a single collector segment 42 at a time, or to engage several segments simultaneously, depending on the currents involved and on the desired electrical circuit of the machine. The brushes 47 are connected, individually or in groups, to the stator conductors 30 by means of connectors 50, which may be flexible in the axial direction to permit thermal expansion, and which are joined to the stator conductors 30 by connectors 51. The electrical circuit of the machine is completed in this way through the stator conductors which may be connected together in the desired circuit configuration by circumferential connectors 52 of any suitable type, the connections being made so that the current flow in the stator conductors is opposite to the direction of current flow in the corresponding rotor conductors.

The operation of the machine will be more fully understood from the diagram of FIG. 4. This figure shows diagrammatically a developed view of a portion of the rotor 14 having conductors 36 thereon. The conductors 36 are insulated from each other as indicated by their spaced relation in FIG. 4. Brushes 47 make electrical contact to the conductors 36 at each end thereof as described above. The brushes may make contact with any suitable number of rotor conductors and are preferably connected together, as indicated in FIG. 4, so that all rotor conductors in each active zone are effectively connected in parallel. If desired, however, the rotor conductors or groups of rotor conductors in each zone could be connected in series so that their voltages add. The field windings 20, as previously described, are arranged to provide successive active zones 26 carrying magnetic fluxes of opposite polarity, separated by inactive or null zones 28 substantially free of magnetic flux. In the circuit of FIG. 4, the rotor conductors 36 in each active zone 26, corresponding to a pole face region 24, are electrically connected together, while the rotor conductors in the intervening null or inactive zone are clear of the brushes and, therefore, are out of the electrical circuit.

As the rotor rotates, therefore, each conductor 36 as it passes through an active zone cuts the radial flux in that zone, so that a voltage is generated and if the external circuit is complete, current flows in the conductor through the brushes 47 which contact it at opposite ends. As the conductor 36 moves out of the active zone, it passes out of engagement with the brushes 47 and enters the null zone where there is no substantial magnetic flux. While the conductor is passing through the null zone, therefore, no voltage is generated in it and no current flows since the conductor is not connected in the circuit of the machine. As the conductor reaches the next active zone 26, it passes into the flux path of that zone so that it again cuts magnetic flux and at the same time it is engaged by the next set of brushes 47 so that it is again part of the electrical circuit. Since it is now in an oppositely-directed magnetic field, the generated voltage is of opposite polarity and current flows in the opposite direction. This process continues as each conductor passes around the circumference of the machine through successive active and inactive zones. It will be seen that because of the segmented construction, each active zone essentially constitutes a homopolar generator in which the rotor conductors pass through a unidirectional magnetic field. These zones are separated by inactive zones so that in effect the machine consists of a plurality of individual homopolar generators disposed in a circumferentially-spaced array.

As each rotor conductor 36 passes out of an active zone 26, it passes out of engagement with the brushes 47 and the current in the conductor is interrupted. The arrangement is preferably such that this occurs as the conductor is leaving the magnetic field so that the generated voltage is decaying at the same time. The current is thus rapidly brought to zero. No current then flows in the conductor as it passes through the inactive zone 28, and current again flows, but in the opposite direction, as the conductor enters the next active zone and engages the next set of brushes. Thus, the current in each rotor conductor is interrupted as it leaves the active zone but is not reversed at that time, since the conductor passes into an inactive zone and is out of the circuit so that there is no current flow in either direction. The change in current in the rotor conductors is thus relatively easy as it is not necessary to reverse the current. This is in direct contrast to commutation in an ordinary direct current machine where the rotor current must be completely reversed almost instantaneously. In the present machine, it is only necessary to interrupt the current at the same time that the voltage is falling to zero. No current then flows in the conductor until it reaches the next active zone. The arrangement of the rotor conductors on the surface of the rotor, rather than in slots, is also advantageous in this regard since it minimizes the inductance of the conductors and, therefore, reduces the self-induced voltage upon interruption of the current.

The complete circuit of the machine may be of any desired configuration. FIG. 5 shows a preferred arrangement in which the rotor conductors in all of the active zones are connected in series so that their voltages add and a reasonably high output voltage is attained. In FIG. 5, the dotted outlines represent the groups of rotor conductors 36 in each active zone at a given instant, the arrows indicating the direction of current flow. The brushes are indicated only diagrammatically to show that in this configuration all the conductors in each active zone are in parallel. The rotor conductors in each active zone are connected to the stator conductors 30 in the same zone which are indicated by the solid lines in FIG. 5, all the stator conductors in each zone being in parallel. The connection is such, as shown in FIG. 5, that the current flow in the stator conductors is opposite in direction to that in the rotor conductors in the same zone. The magnetic fluxes generated by these currents, therefore, tend to cancel and the rotor or armature reaction flux is compensated. It will be understood that although a series connection of all the rotor and stator conductors is shown in FIG. 5, other circuit configurations are possible. Thus, any desired series or series-parallel connection of the rotor and stator conductors in the several active zones may be utilized, depending on the voltages and currents desired. If still higher output voltage is required, the rotor conductors in each active zone might be separated into groups and connected in series in each zone, as previously mentioned. Any suitable circuit configuration may be utilized as long as the stator conductors are connected to carry currents in opposition to those of the corresponding rotor conductors.

It will now be apparent that a homopolar dynamoelectric machine has been provided which has many advantages. This machine is a circumferentially-segmented magnet machine in which the magnetic structure is circumferentially divided into successive active and inactive zones. This results in a machine which is capable of much higher power density than known types of machines so that the size and cost of a machine of a given capacity are low. The capacity can, of course, be further increased by the provision of suitable ducts or passages for liquid coolant if desired. The machine has the further advantage that the current-collection problem is greatly reduced, as compared to known types of machines, so that it is not necessary to resort to complicated arrangements with large numbers of brushes and slip rings, or to the dangerous and unsatisfactory use of liquid metal current-collection systems. A new direct current machine is thus provided of low size and cost and high efficiency.

What is claimed is:

1. A dynamoelectric machine comprising a stator member having a cylindrical internal surface and a cylindrical rotor member supported for rotation coaxially of the stator member, said stator member having a plurality of circumferentially disposed recesses extending longitudinally in said internal surface, field windings disposed in said recesses and electrically connected in a manner to produce radially-directed magnetic fields in the circumferentially disposed spaces between the recesses, the magnetic fields alternating in polarity around the circumference of the machine, a plurality of stator conductors disposed in slots extending longitudinally in said internal surface in the spaces between the recesses, a plurality of rotor conductors extending longitudinally of the rotor member, current-collecting means at each end of the machine for making electrical contact with said rotor conductors at both ends thereof, and means for electrically connecting the current-collecting means to said stator conductors to form a complete electrical circuit including the stator conductors and the rotor conductors.

2. A dynamoelectric machine as defined in claim 1 in which said radial magnetic fields are limited to active zones substantially defined by the spaces between said recesses and separated by inactive zones which are substantially free of radial magnetic flux, and said current-collecting means being disposed to make contact only with the rotor conductors passing through said active zones.

3. A dynamoelectric machine as defined in claim 2 in which the current-collecting means are connected to the stator conductors in a manner such that the stator conductors in each active zone carry currents opposite to the currents flowing the rotor conductors passing through that zone.

4. A dynamoelectric machine as defined in claim 2 in which said rotor conductors include contact means at each end thereof, and said current-collecting means comprises stationary brushes engaging the contact means of the rotor conductors passing through the active zones.

5. A dynamoelectric machine as defined in claim 4 in which said contact means comprises an insulated connector extending radially inward from each end of each rotor conductor, and an insulated conducting segment connected to the inner end of each of said connectors, said segments at each end being supported in a ring of smaller radius than the rotor in position to be engaged by said brushes.

6. A dynamoelectric machine as defined in claim 2 in which said rotor conductors comprise insulated conductor bars disposed on the cylindrical surface of the rotor member, and means for retaining said conductor bars in place on the rotor member.

7. A dynamoelectric machine as defined in claim 2 in which at least some of the rotor conductors passing through each active zone at any instant are connected together at each end by the current-collecting means, and the stator conductors of each active zone are connected in series with the rotor conductors in the same zone to carry current in the opposite direction.

8. A dynamoelectric machine as defined in claim 7 in which the rotor conductors in each active zone are connected in groups, and means for connecting said groups in series with the stator conductors in such a manner that the voltages of the groups are additive.

* * * * *